UNITED STATES PATENT OFFICE.

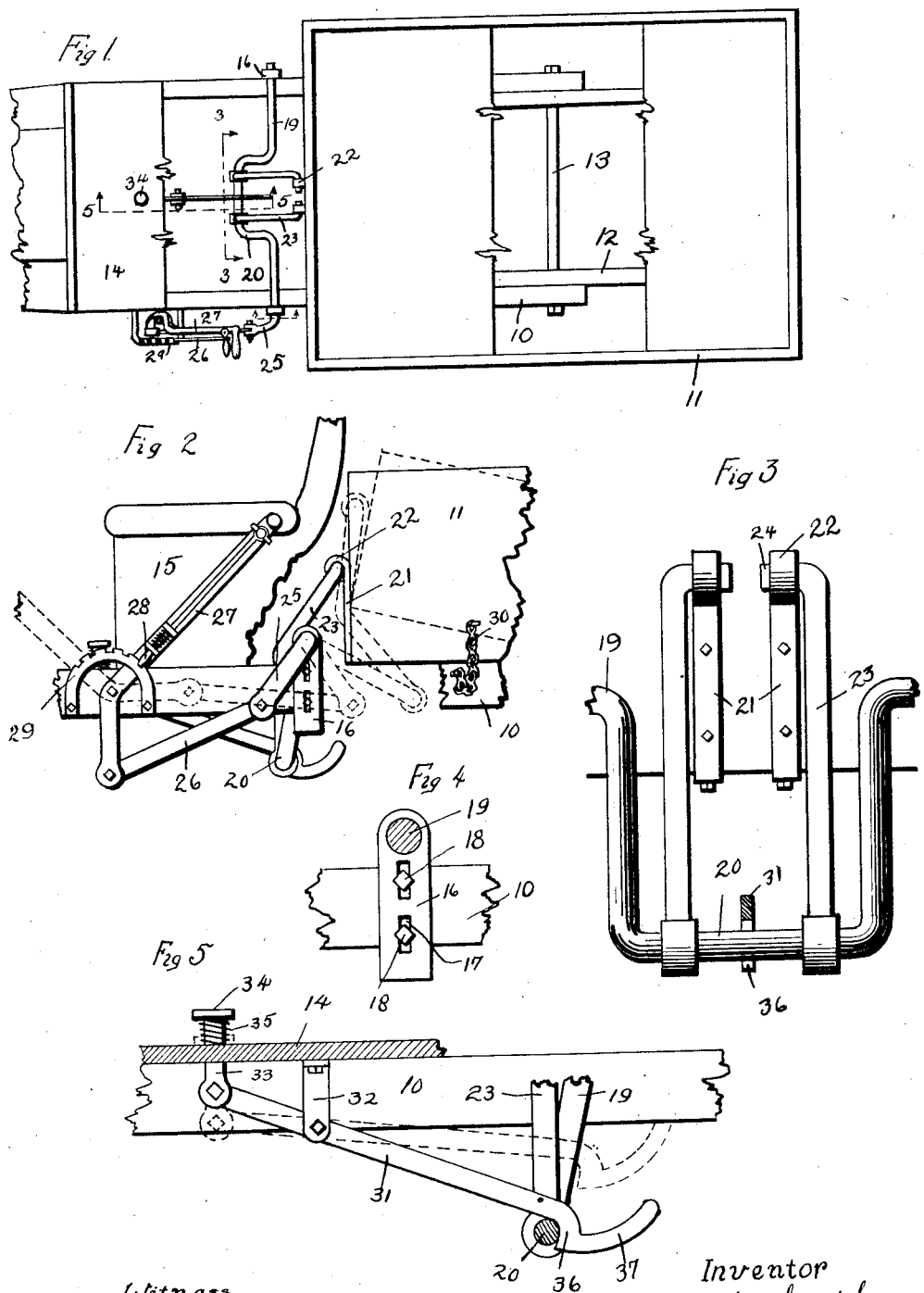

BERNHARD J. SYNSTELIEN, OF FONDA, IOWA.

DUMPING-BED DEVICE.

1,330,015.   Specification of Letters Patent.   Patented Feb. 3, 1920.

Application filed July 16, 1918. Serial No. 245,175.

*To all whom it may concern:*

Be it known that I, BERNHARD J. SYNSTELIEN, a citizen of the United States, and a resident of Fonda, in the county of Pocahontas and State of Iowa, have invented a certain new and useful Dumping-Bed Device, of which the following is a specification.

The object of my invention is to provide a dumping bed device of simple, durable and inexpensive construction. More particularly it is my object to provide a dumping bed device having mechanism for controlling the dumping bed, whereby the parts are so arranged that when the dumping bed is either in its normal position or is in its load discharging position, the controlling mechanism parts will stand in such position as to tend to hold the bed in its then position.

A further object is to provide such a device having a controlling lever, and having a foot controlled locking device so arranged that the controlling lever cannot be operated for moving the bed to discharged position, without operating the foot controlled locking lever for releasing it.

With these and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 shows a top or plan view of a dumping bed device, embodying my invention.

Fig. 2 shows a side elevation of the same, parts being broken away.

Fig. 3 shows a detail sectional view of part of the operating mechanism, taken on the line 3—3 of Fig. 1.

Fig. 4 shows a detail, sectional view of one of the adjustable brackets; and

Fig. 5 shows a detail, sectional view of part of the frame and the foot controlled lock mechanism taken on the line 5—5 of Fig. 1.

In the accompanying drawings, I have used the reference numeral 10 to indicate generally the fixed frame of a truck or the like on which my improved dumping bed device is mounted.

The dumping bed 11 is provided with spaced, longitudinally arranged members 12 on its bottom which are pivotally supported on the frame 10 by means of a transverse shaft 13, preferably arranged at the fore and aft center of the dumping bed or just rearwardly thereof.

At the forward part of the frame 10 is the floor or bottom 14, and a seat 15.

Mounted on the frame 10 forwardly of the dumping bed 11 is a pair of spaced brackets 16, preferably having spaced, vertically elongated holes 17. Bolts 18 are extended through the holes 17 and the frame 10. By loosening the bolts 18 the brackets 16 may be adjusted vertically as may be desired.

Rotatably mounted in the upper ends of the brackets 16 is a transverse shaft 19 having at its central portion a crank 20, clearly shown in Figs. 1 and 3.

At the forward end of the dumping bed 11 there are mounted two brackets 21 having at their upper ends bearings 22.

Pivotally mounted on the crank 20 are two upwardly extending arms 23 having at their upper ends right-angled extensions 24, which are rotatably mounted in the bearings 22.

On one end of the shaft 19 is a right-angled extension 25 to which is pivoted a forwardly extending link 26.

Pivotally mounted between its ends on the frame 10 is a lever 27 on which is a spring actuated pawl 28, designed to coact with a toothed sector 29.

The forward end of the link 26 is pivoted to the lower end of the lever 27.

The parts just described are so arranged that when the dumping bed is in its normal horizontal position, the longitudinal axis of the shaft 19 will be in a line between the pivot points at the upper and lower ends of the arms 23, so that any tendency of the forward end of the bed 11 to move upwardly, is opposed by a straight pull from the pivot points at the lower ends of the arms 23 against the shaft 19, and there is little or no tendency for such upward movement of the forward end of the dumping bed to rotate said shaft 19.

The parts are also so arranged that when it is desired to move the bed 11 to dumping position, the lever 27 may be grasped and after the pawl 28 has been released, the lever may be moved forwardly, thereby through the link 26 and arm 25 imparting rotation to the shaft 19 for causing the crank 20 to swing rearwardly and upwardly, as illustrated by dotted lines in Fig. 2, for thereby forcing the arms 23 upwardly for raising the forward end of the dumping bed.

It may be mentioned that the arms 23 are not straight but are bent, as illustrated in Fig. 2, especially in dotted lines, so that said arms form a support for the forward ends of the dumping bed, when the latter is in its discharging or dumping position.

It should also be mentioned that the parts are so constructed and arranged that when the bed is in dumping position, the lower part of the lever 27, which is pivoted to the link 26, and said link 26 are alined with each other, as illustrated in Fig. 2, so that any tendency of the forward end of the dumping bed to be lowered tends to force the link 26 toward the pivot point of the lever 27 in a straight line, so that the alinement of the lower part of the lever 27 and said link tends to lock the dumping bed in its discharging position.

It will be noted that by adjusting the brackets 16, 16 which is necessary in the ordinary assembling of the parts so as to accomplish the purpose above mentioned, the link 26 and the lower part of the lever will be properly alined when the bed is in dumping position, and the axis of the shaft 19 will be in a line between the pivot points at the opposite ends of the arms 23 when the bed is in normal or load carrying position.

Chains 30 are preferably secured to the dumping bed 11 near its forward end and to the frame 10 to limit the swinging movement of the dumping bed, and to reduce the strain on the actuating parts.

I have found in the use of my improved dumping bed device that when the bed is loaded, ordinarily there is no danger of any accidental movement of the bed to discharging position. However, as a proper precaution and to insure that the dumping bed will retain its proper position, I have provided a locking device comprising a locking lever 31 pivoted between its ends on a bracket 32, as illustrated in Fig. 5.

At its forward end the lever 31 is pivoted to an upright member 33 slidably mounted in the floor 14 and having at its upper end a head 34.

Between the head 34 and the bed 14 is a coil spring 35 which normally tends to hold the forward end of the lever 31 in its raised position.

At the rear end of the lever 31 is a catch member 36, extending rearwardly from which is a curved guide device 37. When the dumping bed is in normal or load carrying position, the catch member 36 engages the central part of the crank 20, as shown in Figs. 3 and 5. When it is desired to move the dumping bed to discharge position, the operator places his foot on the head 34 and forces the member 33 downwardly, thereby raising the rear end of the lever 31, and moving the catch member 36 away from the central portion of the crank 20, whereupon the lever 27 may be manipulated for raising the forward end of the dumping bed.

After the load has been discharged, the dumping bed may be returned to normal position by simply manipulating the lever 27.

In the return swinging movement of the central part of the crank 20, said part engages the curved member 37 on the rear end of the lever 31 for raising it until the central portion of the crank 20 releases the catch member 36, whereupon the spring 35 will actuate the lever 31 for moving it to position for causing the catch member 36 to swing downwardly for engaging the central portion of the crank 20 and locking it, which position is shown in Fig. 5.

It will be seen from the foregoing description that I have provided a dumping bed and actuating mechanism therefor with parts so arranged that they tend to normally lock the dumping bed in its normal position, and also in its dumping position after the bed has been moved to either of said positions.

By such an arrangement of the parts the strain on the parts, during the use of the device, is very greatly reduced.

It will be noted also that when the dumping bed is in its discharging position, as illustrated by dotted lines in Fig. 2, it tends to rest in the angle in the arms 23, as shown by said dotted lines, and any downward pressure on the forward end of the dumping bed tends to rotate the shaft 19, but the alinement of the link 26 and the lowering of the lever 27 locks the dumping bed with its forward end resting in said angle.

In assembling the parts they may be readily adjusted in proper position for operation, as hereinbefore described, by means of the adjustable brackets 16.

Some changes may be made in the construction and arrangement of the various parts of my improved dumping bed device without departing from the essential features and purposes of my invention, and it is my intention to cover by this application any modified forms of structure or use of mechanical equivalents, which may be reasonably included within the scope of my claims.

I claim as my invention.

1. In a device of the class described, a frame, a dumping bed pivotally supported thereon, a shaft mounted on said frame having a crank formed thereon, an arm pivoted to said crank and to said dumping bed, the parts being so arranged that the pivot points of said arm lie in a line which intersects the axis of said shaft when the dumping bed is in normal position, a lever pivotally supported between its ends on said frame, a right-angled extension on said shaft, a link pivoted to said extension and to said lever, the parts being so arranged that when the dumping bed is in discharging position, said link and the controlling lever to which it is attached are substantially alined with each other.

2. In a device of the class described, a frame, a dumping bed pivotally supported thereon, a shaft mounted on said frame having a crank formed thereon, an arm pivoted to said crank and to said dumping bed, the parts being so arranged that the pivot points of said arm lie in a line which intersects the axis of said shaft when the dumping bed is in normal position, a lever pivotally supported between its ends on said frame, a right-angled extension on said shaft, a link pivoted to said extension and to said lever, the parts being so arranged that when the dumping bed is in discharging position, said link and the controlling lever to which it is attached are substantially alined with each other, and a foot controlling device for engaging said crank and locking said crank in one position of its movement.

3. In a device of the class described, a frame, a dumping bed pivotally supported thereon, a shaft mounted on said frame having a crank formed thereon, an arm pivoted to said crank and to said dumping bed, the parts being so arranged that the pivot points of said arm lie in a line which intersects the axis of said shaft when the dumping bed is in normal position, a lever pivotally supported between its ends on said frame, a right-angled extension on said shaft, a link pivoted to said extension and to said lever, the parts being so arranged that when the dumping bed is in discharging position, said link and the controlling lever to which it is attached are substantially alined with each other, a foot controlling device for engaging said crank and locking said crank in one position of its movement, said last described device comprising a locking lever pivoted between its ends on said frame having a catch member at one end, an upright member slidably mounted and pivoted to the other end of said locking lever, and a yielding device for normally holding said locking lever in one position of its movement.

Des Moines, Iowa, July 2, 1918.

BERNHARD J. SYNSTELIEN.